Feb. 6, 1945.   J. T. LANCASTER   2,368,849
LASTING MACHINE
Filed Oct. 1, 1942   7 Sheets-Sheet 5
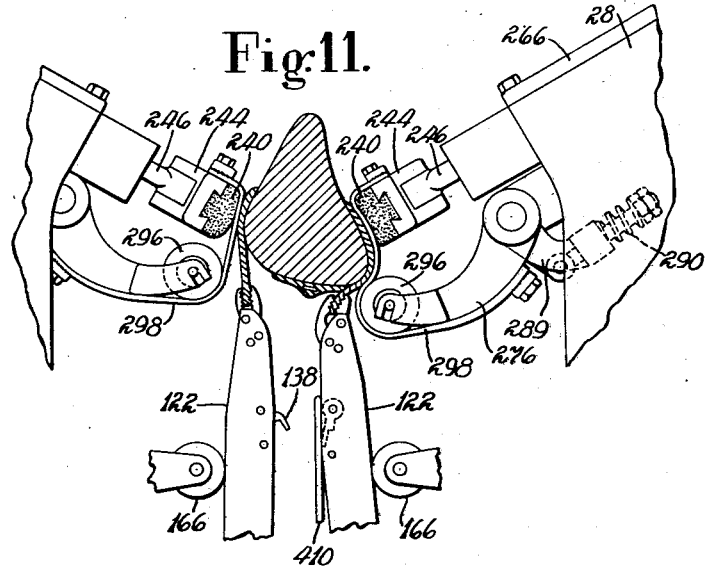
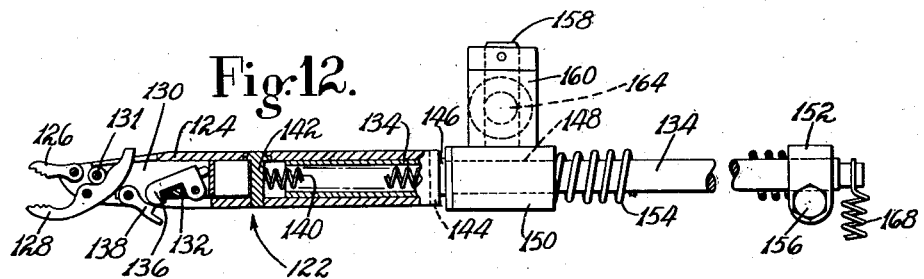
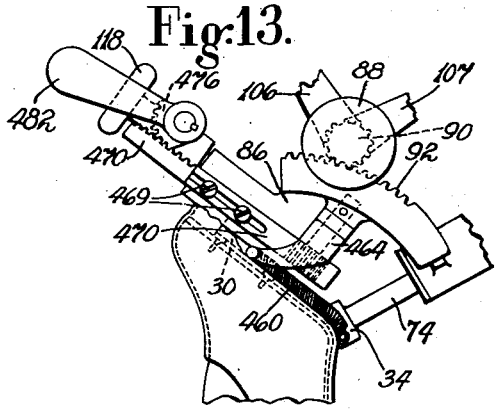
INVENTOR
John T. Lancaster
By his attorney Feb. 6, 1945.     J. T. LANCASTER     2,368,849
LASTING MACHINE
Filed Oct. 1, 1942     7 Sheets-Sheet 6

INVENTOR
John T. Lancaster
By his attorney

Patented Feb. 6, 1945

2,368,849

UNITED STATES PATENT OFFICE 2,368,849

LASTING MACHINE

John T. Lancaster, Newton, Mass., assignor to United Shoe Machinery Corporation, Flemington, N. J., a corporation of New Jersey Application October 1, 1942, Serial No. 460,380

49 Claims. (Cl. 12—7)

This invention relates to lasting machines, and is herein illustrated as applied to a machine for lasting shoes by tensioning the upper about the waist portion of the last, laying the tensioned upper in over and pressing its lasting margin against the bottom of the shoe in the shank, and then continuing the lasting operation by laying-in the unlasted upper on opposite sides of the shoe forwardly of the ball line into the forepart and pressing it against the shoe bottom. A machine of this type is shown in United States Letters Patent No. 2,222,212, granted November 19, 1940, on an application of mine, and in one aspect a principal object of this invention is to provide improvements in machines of this kind. It is to be understood, however, that the several features of this invention are not limited to use in machines of the aforementioned character, but instead, as will be apparent to a person skilled in the art, are of broader applicability.

With this and other objects in view, and in accordance with a feature of this invention, the herein illustrated machine is provided with improved means for supporting and readily locating in the machine shoes of various sizes and different styles so that their shank portions are brought into the same relative position to be operated upon by the lasting instrumentalities. As herein shown, these means comprise a toe plate and heel support, both of which are readily adjustable lengthwise of the shoe to accommodate shoes of different sizes, and a ball gage adapted to contact the curved portion of the bottom of a shoe, where the forepart merges into the shank, thus to serve as a means for locating all shoes, regardless of size, in the same lengthwise position in the machine relative to the lasting instrumentalities. The toe plate is arranged for movement in two directions relative to the heel support for accommodating lasts of different heel height and swing in such a way that their shank portions are brought into the same relative position in the machine, and the ball gage is adapted to be withdrawn out of the way of other operating devices during an early stage in the operation of the machine and after the gage has performed its aforementioned locating function.

The construction herein illustrated has upper-tensioning devices in the form of grippers for tensioning the upper about the waist portion of the last, and these grippers operate, in conjunction with improved overlaying devices, to wrap the tensioned upper tightly about the last and to lay it in over the shoe bottom, first on one side of the shoe and then on the other. In accordance with further features of this invention, this machine is provided with novel means for engaging the grippers and moving them inwardly over the shoe bottom, together with mechanism for releasing the grippers at predetermined points in their inward movements. As herein shown the grippers are held in their normal positions by yieldable means which permit them to turn about their longitudinal axes and also to move lengthwise of the shoe, thus to accommodate their pull on the upper to the changing contour of the last as the upper is wrapped around it during the inward movements of the grippers. At the completion of a cycle of operations of the machine, the grippers are returned to their original positions with their jaws opened to receive the upper of the next shoe to be lasted. The opening of the gripper jaws is effected by the engagement of portions of the gripper casings with gripper-opening lugs, and, in accordance with another feature of the invention, the illustrated machine is provided with novel means for changing the position of these opening lugs simultaneously with adjustments of the grippers toward or away from the shoe bottom, and with means for moving these lugs out of the way of the gripper casings during their operation to tension the upper and to lay it in over the shoe bottom.

Various other novel features are also to be recognized in improved means for progressively engaging the upper, as it is wrapped around the last by the grippers, to press the upper firmly against the last and also to press its lasting margin against the bottom of the shoe. In the illustrated machine, the overlaying devices comprise two flexible webs positioned one on each side of the shoe support. One end of each flexible web passes over, and is secured to, an upper-clamping member having a resilient pad, and its other end is attached to a carrier on which there is a roll over which the body of the web is wrapped. When the machine is started, and before the grippers tension the upper, the upper-clamping members are moved inwardly toward the shoe and their resilient pads, acting through the web, clamp the top edge of the upper firmly against the last, above the localities in which the grippers take hold, so that the upper cannot be caused to slip downwardly over the last, under the pull of the grippers, and in this way distort the foot opening of the shoe. After the grippers have tensioned the upper they are swung inwardly to wrap it around the last, first on one side of the shoe and then on the other, and the overlaying devices operate in conjunction with the grippers. As the gripper on each side of the shoe moves inwardly the web carrier on that side follows and causes the web progressively to engage the upper as it is wrapped about the last. Accordingly, when the gripper reaches the end of its inward movement, the web will have followed in so as to hold the upper against the last in such a way that it cannot loosen when the gripper is released. As the gripper is released, the continued movement of the carrier causes the web to wrap the upper still further about the last, and the roll, acting through the web, passes in over the shoe bottom and presses the lasting margin firmly thereagainst.

The illustrated machine is also provided, in accordance with still another feature of this invention, with novel devices for continuing the lasting operation forwardly from the shank portion into the forepart on opposite sides of the shoe. As herein shown, these devices are hand operated, and comprise flexible elastic cable-like members which are of substantially circular cross section and preferably diametrically compressible. Each of these members is connected at one end to the ball gage, and the other ends are secured to swingable arms. Normally these arms are so positioned that the members extend outwardly from the ball gage and away from the shoe. Accordingly, when the ball gage is restored to contact with the shoe bottom, after the overlaying devices have completed their operation, the inner ends of these cable-like members are brought out against the shoe bottom at points somewhat in back of the ball line. Now, as the arms are swung by the operator, the cable-like members are likewise swung and caused to move forwardly and inwardly over the shoe bottom, carrying with them the unlasted upper portions which extend forwardly of the ball line into the forepart. The support for the toe plate has a flat surface which is spaced from and parallel to the shoe bottom, and the size of these cable-like members is such that they are slightly compressed between this surface and the overlaid upper, and in this manner pressure is applied to the overlasted upper in the forepart to press it against the bottom of the shoe.

The above and other features of the invention will now be more particularly described with reference to the accompanying drawings and thereafter pointed out in the claims.

In the drawings,

Fig. 4 is a sectional view of a part of the upper-tensioning mechanism of the machine taken substantially on the line IV—IV of Fig. 1 and looking in the direction of the arrows;

Fig. 5 is a sectional view taken on the line V—V of Fig. 4 and looking in the direction of the arrows;

Fig. 6 is a plan view of certain parts of the mechanism for releasing the upper materials from the upper-tensioning mechanism;

Fig. 11 is a view of the operating elements shown in Fig. 10 but with these elements in a different and earlier stage in their operation;

Fig. 13 is a view in side elevation of a part of the machine and illustrating the operation of the forepart-lasting devices on one side of the machine;

Fig. 17 is a chart showing the timing of the several operating cams of the machine.

Figure 1:
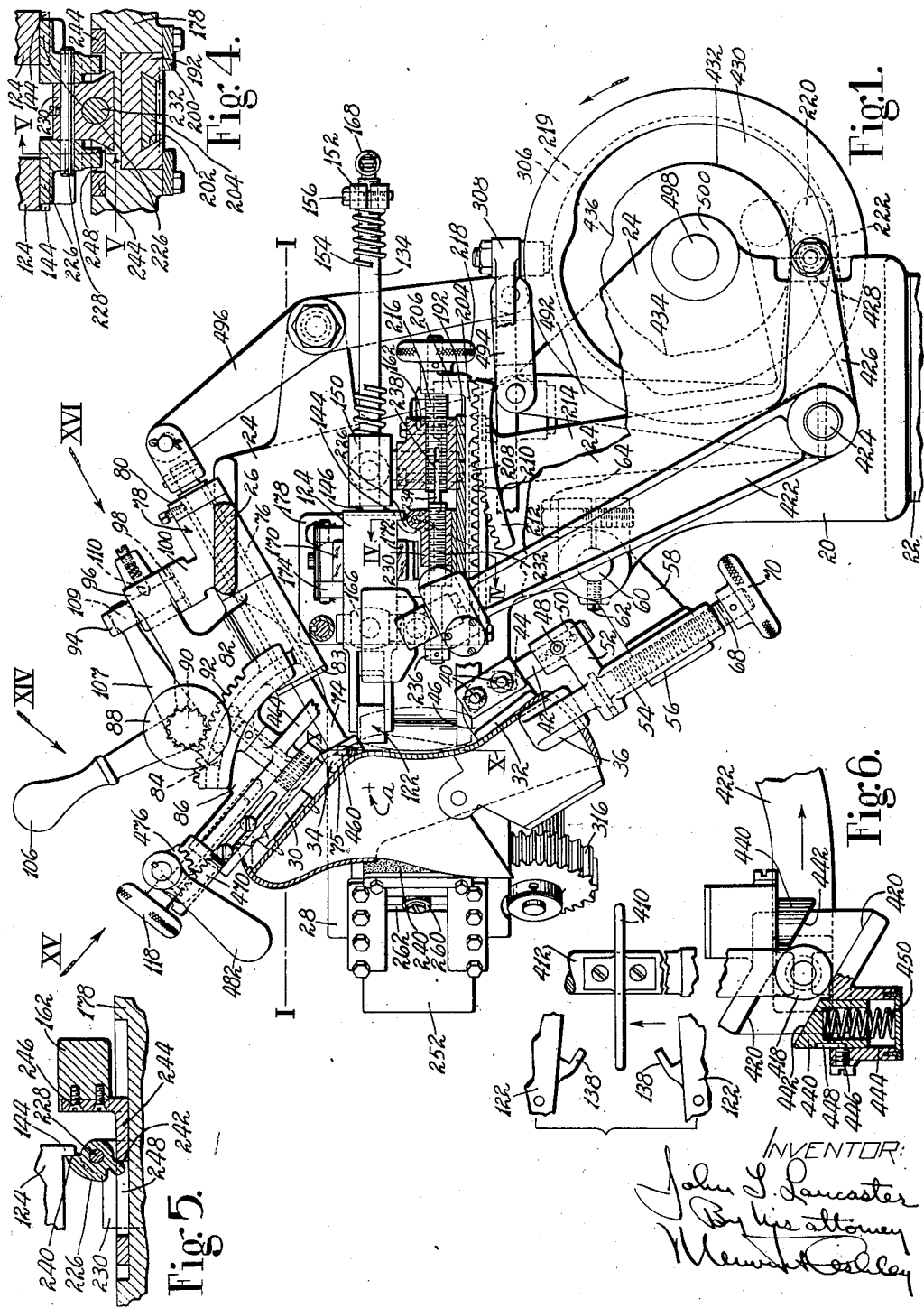
Fig. 1 is a view in side elevation of a machine embodying the features of this invention, with certain parts in section and others broken away.
Figure 2:
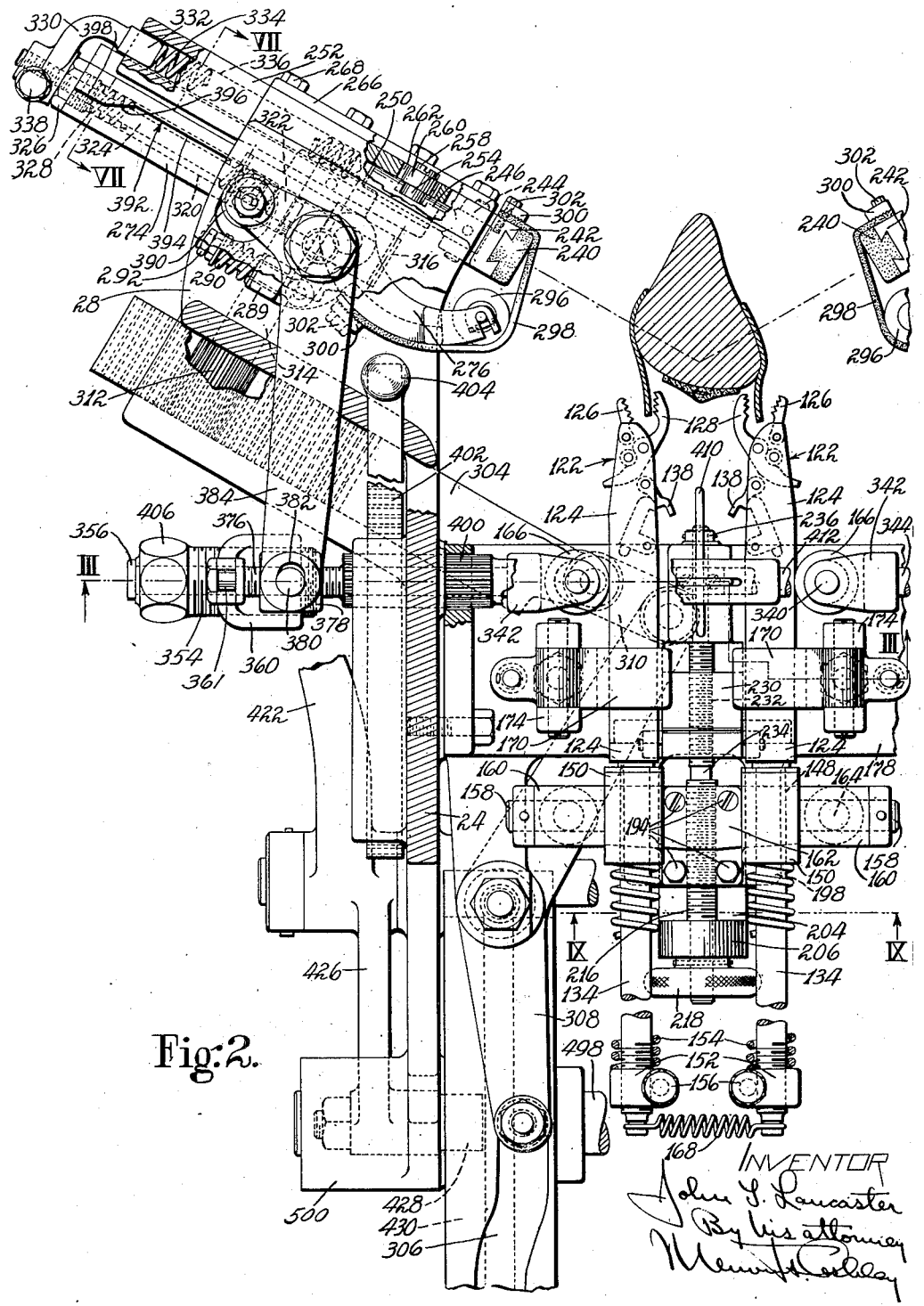
Fig. 2 is a plan view of the machine shown in Fig. 1 taken from a plane indicated by the line I—I in the last-mentioned figure and with a portion of the machine broken away.

The illustrated machine comprises a frame 20 which is supported on the top of a post 22 of convenient height. This frame is of hollow construction and has side faces 24, a top crossbar 26 and two spaced-apart forwardly extending arms 28 (Figs. 1 and 2). In Fig. 1, one of the arms 28 and a part of a side face 24 has been broken away to expose the mechanism within the frame. During the operation of the machine, the shoe to be operated upon is supported upon a toe plate 30 and a heel plate 32, and its location lengthwise is determined by means of a ball gage 34. Associated with the heel plate is a back rest 36 for embracing the heel end of the shoe. The heel plate is mounted for swinging movement heightwise of the shoe on pins 40 carried by the bifurcated end portion of a rod 42 and which extend through arcuate slots 44 provided in a rib 46 extending from the back side of the heel plate. This rod is secured by means of a cross pin 48 which extends through adjusting holes 50 therein, to a laterally extending arm 52 on a U-shaped slide 54. This slide is mounted in guideways 56 on the opposite sides of a forwardly and downwardly extending arm 58 which is secured to the frame by means of a supporting shaft 60, set screws 62 and clamping nuts 64. The back rest 36 is formed as an extension of the slide 54 to which an adjusting screw 68, threaded into the arm 58, is rotatably attached. A hand wheel 70 is pinned to the lower end of the adjusting screw 68 for turning the screw to adjust the heel plate 32 and back rest lengthwise of a shoe in the machine.

Figure 15:
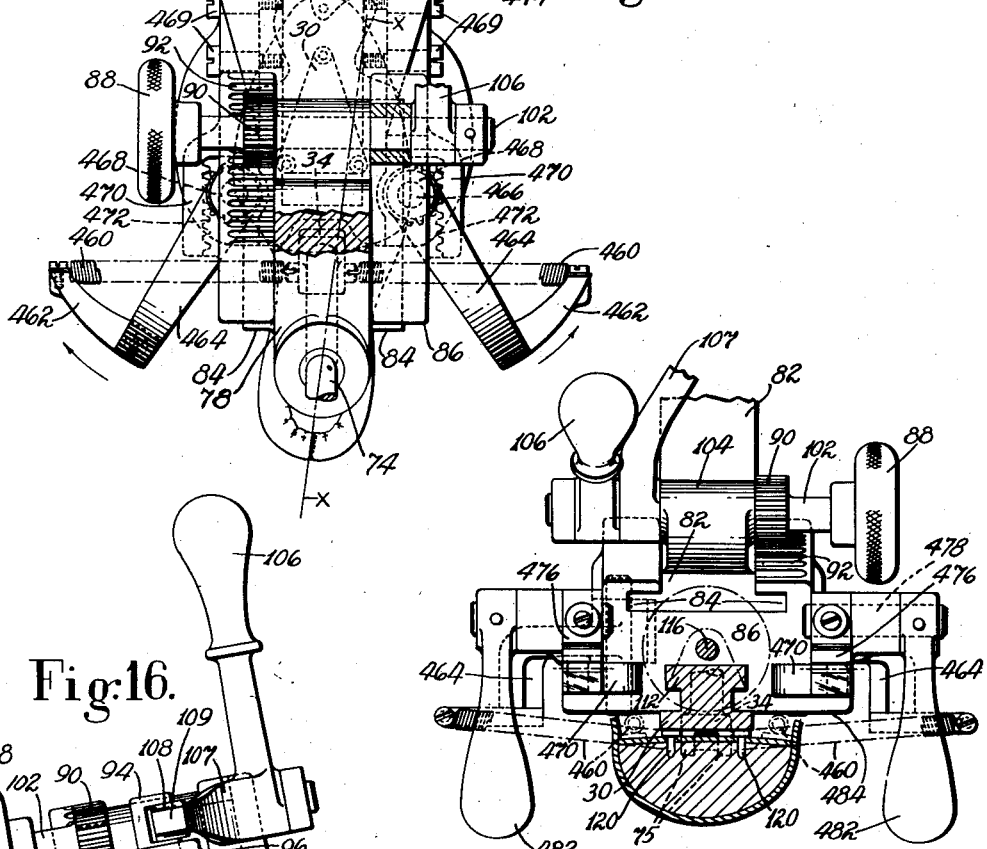
Fig. 15 is a view, partly in section, of the parts shown in Fig. 14 looking in the direction of the arrow XV in Fig. 1.

The ball gage 34 comprises an enlargement on the lower end of a rod 74 and has spaced ribs 75, see Fig. 15, that extend lengthwise of the shoe. The bottom faces of these two ribs are formed as arcs struck from centers on a line extending transversely through the ball center *a* of the shoe (Fig. 1). The ball center is here considered as the center of curvature of that portion of the shoe bottom which curves abruptly from the substantially flat forepart to the shank. The location of this center is about as is indicated in Fig. 1 and does not vary an appreciable amount from this position in different styles of lasts or between different sizes of shoes. Accordingly, the aforementioned curved portion of any shoe bottom will be substantially complemental to the curved bottom faces of this ball gage. The ball gage thus fits over the shoe bottom at this point, sometimes called the "break," and in this way serves as a means for locating the shoe in a lengthwise direction in the machine. The ball gage, as will be hereinafter described, is arranged to be withdrawn during the operation of the machine, but before the machine is started it occupies the position shown in Fig. 1 and contacts the bottom of the shoe. The heel plate and toe plate afford two fixed points of support for the shoe and by means of these two fixed points all shoes are located in the machine in the same relative position and so that their shank portions (see line *x—x* in Fig. 1) are substantially normal to the line of action of the upper-tensioning means and parallel to the direction of action of upper-overlaying devices about to be described.

Figure 16:
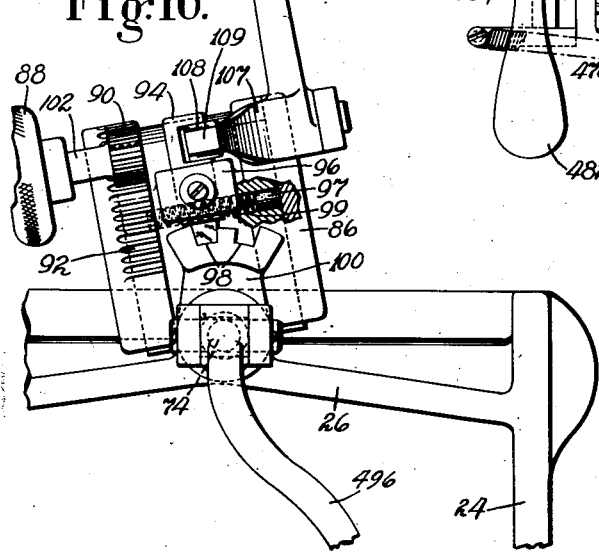
Fig. 16 is a view, partly in section, of parts of the machine looking in the direction of the arrow XVI in Fig. 1.

In order to compensate for changes in the angular positions of the foreparts of shoes, as their heel height varies, the toe plate is arranged for swinging movement heightwise about the ball center *a* of each shoe. The rod 74 is slidable in a sleeve 76 which is held in a boss 78 on the crossbar 26 of the frame by means of a collar 80. An upwardly extending bracket 82 is rotatably mounted on the sleeve between a shoulder 83 thereon and a downwardly extending face on the boss 78. On the front of this bracket there are oppositely facing arcuate guides 84 (Figs. 1, 14 and 15) on which a carrier 86 is swingable heightwise of the shoe by means of a hand wheel 88, pinion 90 and rack teeth 92 cut on the carrier. Friction plugs 97, carried by the bracket and each pressed outwardly against the carrier by a spring 99 (Fig. 16), serve as brakes to hold the carrier in any position to which it is moved. The bracket 82 and with it this carrier are also swingable laterally of a shoe on the sleeve 76, to position the toe plate for rights and lefts, and are held in one of two positions by means of a locking plug 94 (Fig. 16) which is slidable in a rearwardly extending portion 96 of the bracket, and notches 98 cut in an upward projection 100 of the boss 78. The pinion 90 is formed integral with a shaft 102 that is journaled in a boss 104 on the bracket 82. This shaft extends beyond the boss to support a handle 106 which has a rearwardly extending arm 107 that is provided at its outer end with a lug 109 engaging a notch 108 in the plug 94. This plug is held in locking position in one or the other of the notches 98 by means of a spring-pressed detent 110 (Fig. 1) but may be withdrawn by forward movement of the handle 106. With the plug thus withdrawn the handle 106 may be swung either to the right or to the left (Fig. 16) to bring the bracket and carrier into their other positions. To facilitate this operation and to prevent overtravel, the notches 98 are made lower on their adjacent sides so that by merely withdrawing the plug a sufficient distance to clear the low side of a notch, the carrier may then be swung until the plug strikes the high side of the other notch. The toe plate 30 is formed as an integral part of a slide 112 (Fig. 15) which is mounted for adjustment lengthwise in the carrier 86. This slide extends beyond the carrier (Fig. 14) where it has an upturned portion 114 in which an adjusting screw 116 is rotatably mounted. This adjusting screw has a hand wheel 118 and is threaded into the carrier. On its bottom face the toe plate 30 has three downwardly extending shouldered pins 120 which are adapted to enter into corresponding recesses in the shoe bottom for the purpose of locating the toe portion of the shoe in the machine in accordance with the method described and claimed in United States Letters Patent to Arthur F. Pym No. 1,674,060, granted June 19, 1928.

In presenting a shoe to the machine, the pins 120 of the toe plate 30 are inserted, for a short distance, into the recesses provided in its insole and then the toe plate and with it the shoe is shifted in a lengthwise direction, by manipulation of the hand wheel 118, until the ball portion of the shoe is located properly, in a lengthwise direction, with respect to the ball gage 34. The shoe is now moved toward the toe plate and ball gage to insert the pins fully until their shoulders bear against the bottom surface of the insole. This brings the curved portion of the shoe bottom into engagement with the arcuate surfaces of the ribs on the ball gage. If the shoe has a lower heel height than the shoe last operated upon by the machine its heel-seat portion will strike the heel plate 32 before contact is made with the ball gage. On the other hand, if its heel height is greater the heel seat will not touch the heel plate. In either event, the heel-seat portion of the shoe is brought to bear on the heel plate by rocking the toe plate, and with it the shoe, about the ball center *a* of the shoe in one direction or the other, by rotating the hand wheel 88. Proper adjustment in this respect is attained when the bottom of the shoe bears evenly on the toe plate, the heel plate and the ball gage. The back rest 36, which is usually withdrawn somewhat before presenting a shoe to the machine in order to afford ample clearance at the heel end while making the above adjustments, is now moved in against the heel end of the shoe by means of the adjusting screw 68 and hand wheel 70. As the toe plate swings about the ball center *a* of all shoes and, since the heel plate does not move heightwise of the shoe, it will be apparent that these two points of support will position all shoes, regardless of size or style, so that their shank portions are substantially parallel to the line *x—x* which is normal to the line of action of the shoe upper tensioning devices.

During the power operation of the machine, the shoe is held in place by the operator and is supported against the heightwise pull of the shank-lasting instrumentalities, about to be described, by the toe plate and heel plate, the ball gage being at this time withdrawn from contact with the shoe bottom. At the conclusion of the power operation of the machine, and while the operator is still holding the shoe in place against the toe and heel plates, a pair of forepart-lasting devices, one for each side of the shoe, are manually operated before the shoe is removed from the machine. As suggested above, the machine is provided with instrumentalities for lasting the shank portion at each side of a shoe and these include devices for gripping the upper materials and for exerting a heightwise strain thereon, to tension the upper about the instep, or waist, portion of the last, and overlaying members for laying the tensioned upper materials over the curved shank portions of the last and for pressing the lasting margins thereof against the bottom surface of the insole. In order to avoid distortion of the upper materials as a result of the pull of these gripping devices, there are associated with the shank-lasting instrumentalities a pair of upper-clamping members which are brought in against the upper materials on each side of the shank portion of the shoe just prior to the operation of the gripping devices. These clamping members remain in clamping position until the operation of the side-lasting instrumentalities on both sides of the shoe has been completed.

The gripping and pulling devices comprise a pair of grippers, indicated generally by the reference character 122, one arranged on each side of a shoe when it is in the machine, see Figs. 1 and 2. These grippers are substantially like those disclosed in United States Letters Patent No. 1,030,264, granted June 18, 1912, on an application filed in the name of R. F. McFeely, and each has a casing 124, a fixed jaw 126, a movable jaw 128, a gripper-operating slide 130 carrying a roll 131 and provided with a crossbar 132, an operating bar 134, a latch 136, and a tripping finger 138, see Fig. 12. Each operating bar is provided with a bore to receive a compression spring 140 one end of which bears against an abutment 142 carried by the gripper casing and extending through an opening in the left-hand end of the operating bar. The gripper casing 124 of the herein illustrated machine corresponds to the element 161 in the aforementioned McFeely patent and is provided with a stop flange 144 similar in function to the stop 124 in the McFeely construction. These grippers operate in the same manner as the McFeely grippers and reference may be made to that patent for a detailed description of their mode of operation.

Figure 12:
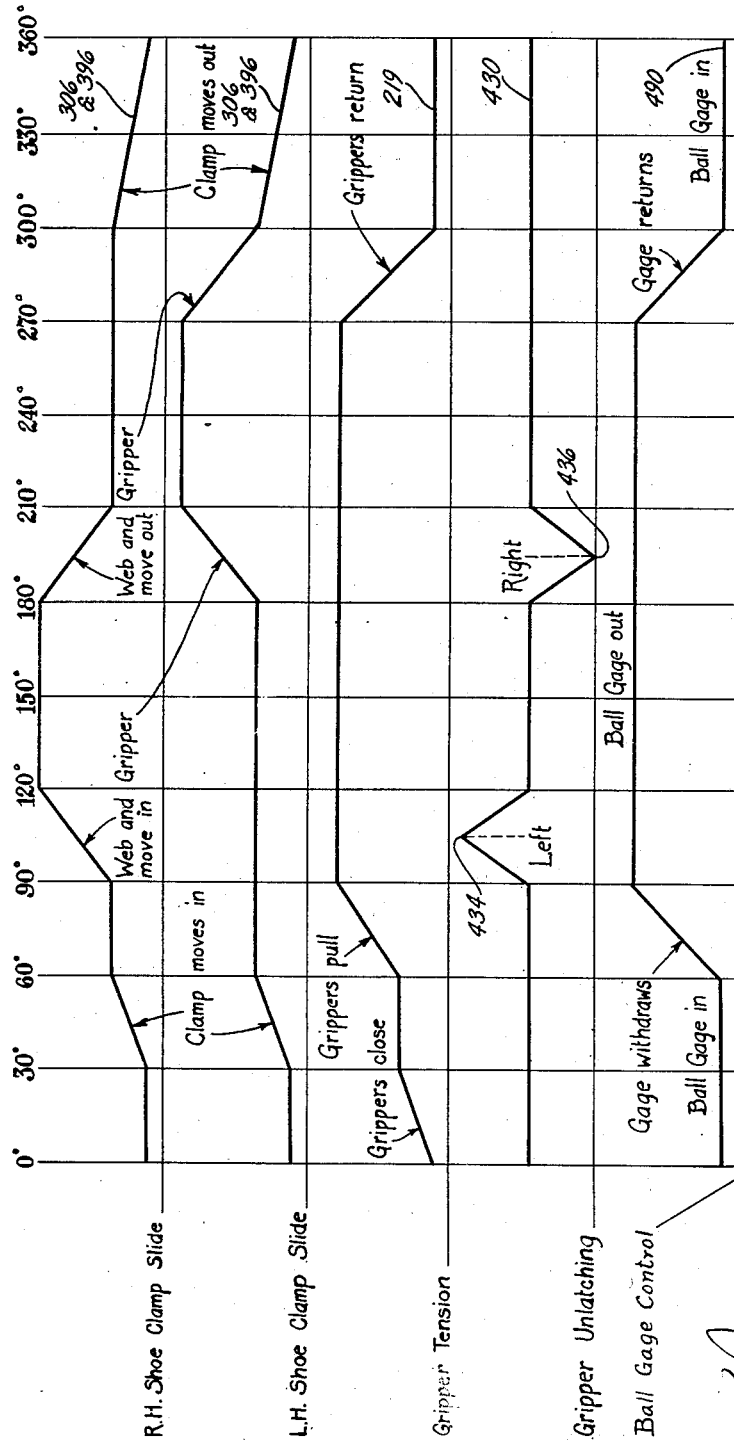
Fig. 12 is a detail view of one of the grippers which form a part of each of the upper-tensioning devices.

In the present machine, each of the operating bars 134 is provided with a shoulder 146 which, when the parts are in the positions shown in Figs. 1, 2 and 12, bears against the casing 124, and beyond their shoulders the bars are extended toward the back of the machine to pass through cylindrical bores 148 in blocks 150. Surrounding the extensions of the operating bars, and interposed between the blocks 150 and adjusting collars 152, are compression springs 154. These adjusting collars are threaded onto the operating bars as shown and are split to provide for frictional locking in adjusted position thereon by means of clamping screws 156.

Figure 3:
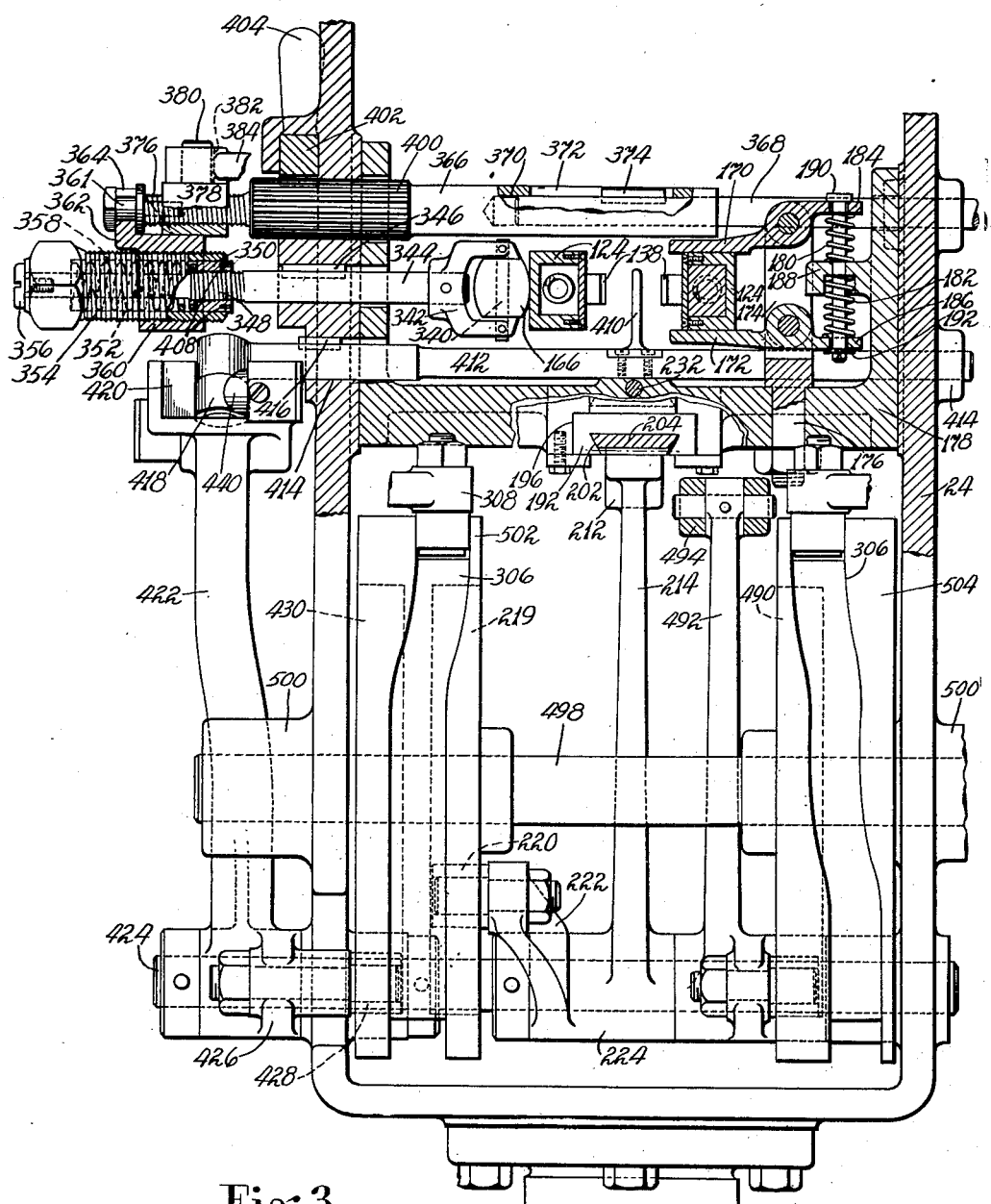
Fig. 3 is a view in rear elevation of a portion of the machine with certain parts in section, on line III—III of Fig. 2, and others broken away.
Figure 9:
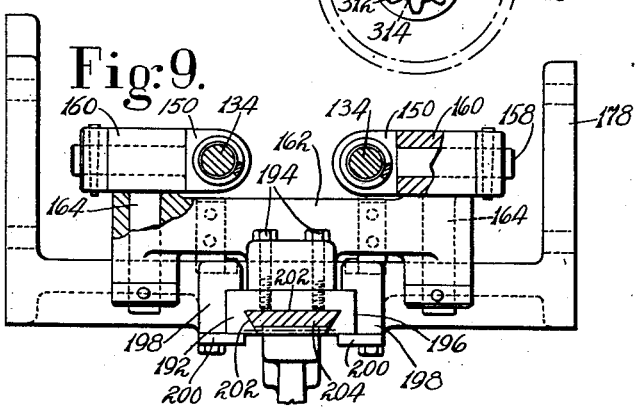
Fig. 9 is a view in rear elevation of a portion of the upper-tensioning mechanism, with certain parts in section, taken on the line IX—IX of Fig. 2 and looking in the direction of the arrows.

The blocks 150 each have a trunnion shaft 158 which is journaled in a pillow block 160 and each pillow block is in turn swiveled to a carrier 162 by means of a trunnion shaft 164, see Figs. 1, 2 and 9. Each of the grippers is, in this manner, mounted for movement lengthwise of a shoe by swinging about the axis of trunnion 158, and widthwise of the shoe by swinging about the axis of trunnion 164, and also is free to turn or twist about an axis extending normal to the shoe bottom by turning in the block 150. Movements of the grippers widthwise of the shoe are effected during the operation of the machine by mechanism about to be described and including convex rolls 166, see Figs. 2 and 3, against which the gripper casings are held by means of a tension spring 168 that is connected to the rearward extremities of the operating bars 134. The grippers are, however, normally constrained against movement lengthwise of the shoe and also against twisting in the following manner. Referring to Figs. 1, 2 and 3, the flat upper and lower surfaces of each gripper casing are embraced by two guide plates 170, 172 which are pivoted to the bifurcated upper portion 174 of a stud 176 secured to a cross plate 178 of the machine frame. These guide plates are yieldingly urged toward the gripper casings by means of springs 180, 182, which are interposed between ears 184, 186 extending beyond the pivotal axes of the plates and a lug 188 on the cross plate, see Fig. 3. Passing through the lug 188, the springs 180, 182 and holes in the ears 184, 186, is a rod having a shouldered upper end 190 and carrying a stop washer 192 at its lower end. The distance between the shoulder and the stop washer is such that the plates 170, 172 just touch the gripper casings. With this arrangement the grippers are yieldingly held, in the positions shown in Figs. 1, 2 and 3, against movement lengthwise of the shoe as well as against twisting movement by the operation of the springs 180 and 182, and at the same time are free to move widthwise of the shoe, being yieldingly held against the surfaces of the rolls 166 by the action of the spring 168. However, during the action of the grippers to pull the upper, the springs 180 and 182 will yield to permit the gripper to turn or to swing lengthwise of the shoe so that their pull accommodates itself to the varying curvature of the last as the upper is moved inwardly and wrapped thereabout.

The gripper-operating bars are moved rearwardly, first to close the grippers and then to move the grippers rearwardly for exerting a pull on the upper, in the following manner: The carrier 162 is secured, by means of screws 194, to a slide 192, Figs. 1, 2, 3, 4 and 9, and this slide is held in guideways 196, formed in the cross plate 178 and in rearwardly extending portions 198 thereof, by means of plates 200. The slide 192 has a dovetail guideway 202 in which an operating slide 204, having an upturned end 206, Fig. 2, is mounted. The lower face of the operating slide is provided with rack teeth 208, Fig. 1, which mesh with teeth 210 on a quadrant 212 formed on the upper end of an arm 214. The carrier 162, and the slide 192 to which it is secured, are adjustably connected to the slide 204 by means of an adjusting screw 216. This adjusting screw is mounted for rotation in the upturned end 206 of the slide 204, and is held against axial movement with respect thereto by means of a shouldered portion on the screw and a hand wheel 218 pinned thereto. The screw 216 is threaded into the carrier 162 so that by turning the hand wheel the carrier may be shifted forwardly and rearwardly with respect to the operating slide 204 for the purpose of initially positioning the grippers in a heightwise direction with respect to the shoe. In Figs. 1 and 2, the grippers are shown as moved to this initial position by means of the action of a gripper-operating cam 219 on a roll 220 carried by an arm 222 extending from a hub 224 on the bottom of the arm 214, Fig. 3. In this position, the gripper jaws are opened to receive the upper materials, and the gripper casings are held against movement toward the shoe, under the action of the spring 140, by the engagement of their stop flanges 144 with two stop lugs 226, Figs. 1, 4 and 5. These stop lugs are pivoted on the opposite ends of a shaft 228 which is secured to and extends through a slide 230, Fig. 4. Threaded through the slide 230 is a screw 232, one end of which is flattened at 234 (Fig. 2), and the other end is rotatably mounted in the cross plate 178. Axial movement of this screw with respect to the cross plate is prevented by means of a shoulder on the screw and a collar 236, Fig. 1. The flattened end of the screw 232 extends into a slot 238 in the adjusting screw 216 so that the two screws will be rotated together by turning the hand wheel 218, and in the operation of the grippers the carrier 162 can move axially with respect to the slide 230 which is held fixed with respect to the cross plate 178 by the screw 232. With this arrangement the positions of the carrier and stop lugs 226 are simultaneously adjusted, and to the same extent, since the lead of the screws 232 and 216 is the same. The stop lugs 226 are shaped in the manner shown in Figs. 1 and 5, and each of these lugs is provided with a stop face 240 and an operating arm 242. When the carrier 162 is in its forward position, Figs. 1 and 2, the stop lugs are each held against rotation in a counterclockwise direction, as viewed in Fig. 5, and in engagement with the stop flanges 144 on the gripper casings, by means of lug-operating plates 244 secured to the carrier 162 by screws 246. The operating arms of the lugs project into elongated slots 248 in the lug-operating plates and when these plates are moved rearwardly with the carrier during the operation of the grippers, the lugs are released so that they turn on the shaft 228 as the gripper casings are moved toward closing position by the springs 140. As the movement of the plates proceeds the lugs continue to turn until their stop faces are wholly removed from engagement with the stop flanges 144 on the gripper casings, the weight of the lugs carrying them down onto the plates 244. In this position, the lugs cannot interfere with the operation of the grippers as they pull the upper. The shape of the lugs are such that their operating arms do not leave the slots 248 so that, when the carrier 162 is returned, the operating plates restore these lugs to their original positions.

Referring to Figs. 1, 2, 10 and 12, the operation of the grippers to seize the upper at each side of the shoe, and to exert a heightwise pull thereon, will now be described. When the machine is at rest the grippers occupy the positions shown in these figures, being located widthwise and heightwise with respect to the shoe, so as to receive the upper materials on each side of the shoe at localities just slightly in back of the ball and adjacent to the point where the bottom of the shoe starts to curve upwardly toward the shank. As the carrier 162 is moved rearwardly by the cam 219, the gripper-operating bars follow, as do the operating plates 244. The movable jaws 128 of the grippers will now be closed on the upper materials, by the action of the gripper-operating slides 130 and rollers 131, Fig. 12, this action taking place in the manner described in detail in the above-mentioned McFeely patent. The carrier continues to be moved rearwardly until the roll 220 ultimately reaches a long dwell on the cam 219, at which time the carrier will have been moved a considerable distance to the right, as viewed in Fig. 1, and sufficiently to compress the springs 154, thereby causing the grippers to exert a strong pull on the upper. This pull operates to tension the upper about the instep or waist of the last, and holds it so tensioned during an initial stage in the operation of the overlaying devices. As will be explained below, the grippers, while holding the upper under tension, are individually moved inwardly by the rolls 166 to wrap the upper around the last, this movement being accomplished in cooperation with the action of the overlaying devices. At the conclusion of their inward movements the latch 136 of each gripper is tripped by means of its tripping finger 138 and a gripper-releasing element about to be described. As each gripper is opened it is moved rapidly in a rearward direction by the expansion of the spring 154 associated with its operating bar. Thereafter, as the carrier is moved forwardly by the cam 218, during a later part of the operating cycle of the machine, the lug-operating plates 244 will pick up the stop lugs 226 and return them to positions for engaging the stop flanges 144 on the gripper casings. After forward movement of the casings is thus stopped, the completion of the forward movement of the carrier 162 will return the gripper-operating bars to their original positions, and the gripper jaws will be opened by the resulting forward movement of their operating slides 130.

Prior to the operation of the grippers, the top edge of the upper, above the localities in which the grippers take hold, is, as has been already suggested, clamped firmly to the sides of the last by means of upper-clamping members comprising resilient pads 240, Figs. 1 and 2, which are supported by the forwardly extending arms 28 of the machine frame. Each pad 240 is secured to a block 242 having at its opposite ends bifurcated portions 244, Figs. 2, 8 and 10. Plungers 246 are connected to these bifurcated end portions by means of pins 248, and these plungers are received in bores 250 in a slide 252, Figs. 2 and 7. An equalizing bar 254, provided with rounded ends 256 that are received in grooves cut in the plungers, carries a stud 258, and on this stud is a roller 260 which fits loosely in a slot 262 in the slide 252. The arrangement is such that the blocks 242 may swing to allow the pads to adjust themselves to the sides of the last as the clamping members are brought in against the shoe by inward movements of the slides 252, but are prevented from swinging out of parallelism with the slides. The slides 252 are held in guideways 264, formed in the arms 28, by means of plates 266 and screws 268, Figs. 2 and 7, and are moved inwardly by mechanism about to be described.

Figure 7:
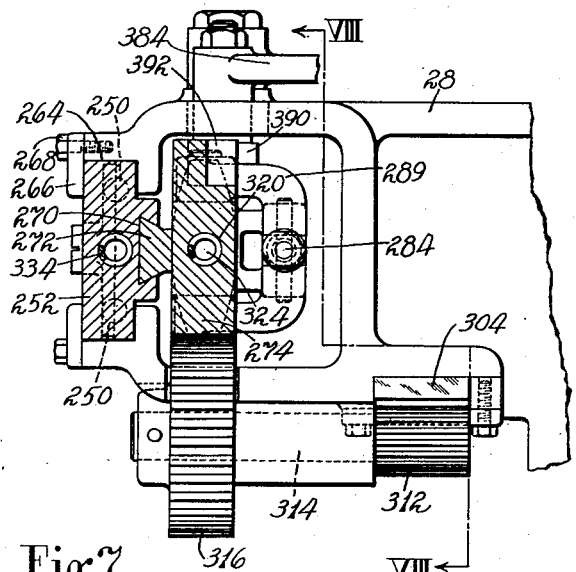
Fig. 7 is a sectional view of the shoe clamp carrier slide on the right-hand side of the machine and parts associated therewith taken on the line VII—VII of Fig. 2 and looking in the direction of the arrows.

On its back face each slide 252 has a dovetail groove 270, and mounted in this groove is a similarly shaped rib 272 on a block 274, Fig. 7. At the inner end of each of these blocks is a curved arm 276, Figs. 2 and 10, which is pivoted on a pin 277 carried by a member 278 swiveled to the block by means of a stud 280, Fig. 10. The member 278 has two rearwardly extending ears 282 to which a threaded rod 284 is connected by means of a cross pin 286, Fig. 8. This rod passes through a hole 288 in a C-shaped extension 289 on the arm 276, and a coil spring 290 is positioned between a flat face on this extension and stop nuts 292 threaded onto the end of the rod 284. The spring 290 yieldingly holds the arm 276 in the position shown in Fig. 2. Mounted between extensions 294 on the arm 276 is a conical roll 296, Figs. 2 and 8, and drawn over this roll is a flexible elastic blanket or web 298, secured at one end to the block 242 and passing over the pad 240, and at its other end to the arm 276 by means of clamping plates 300 and screws 302. These rolls and webs constitute the overlaying members for laying the tensioned upper material over the last and for pressing it against the insole, as will presently appear.

Figure 8:
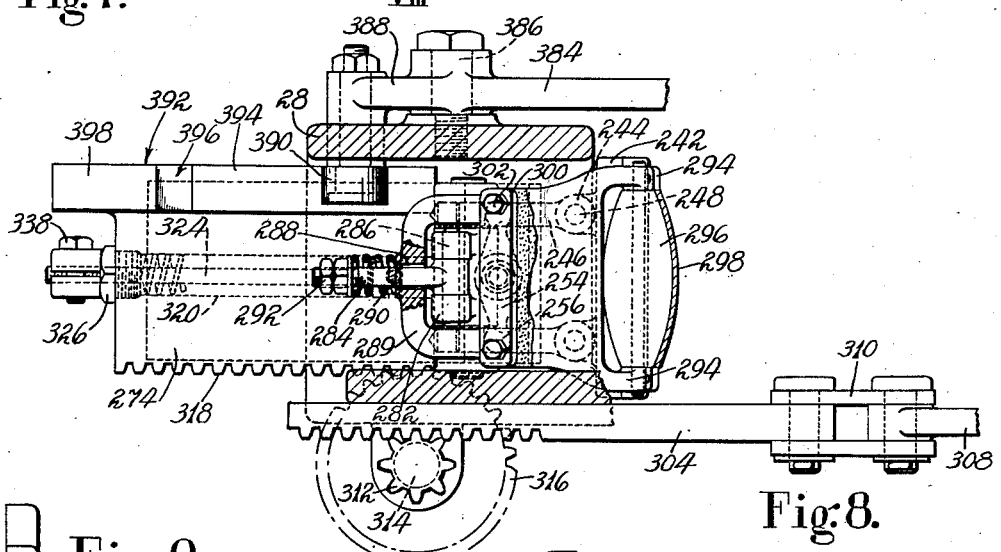
Fig. 8 is a rear view, partially in section, of the parts shown in Fig. 7 taken on the line VIII—VIII of the last-mentioned figure and looking in the direction of the arrows.

The blocks 274 are moved inwardly by means of operating racks 304 which are actuated by cams 306 (Fig. 3) through bell-crank levers 308 and links 310, Figs. 2 and 8. In these figures the mechanism for operating the block on the right-hand side of the machine only is shown, but it will be understood that its exact counterpart is provided on the left-hand side of the machine, and likewise that the supporting and operating mechanism for the upper-clamping member 240 and overlaying members 296 and 298 is likewise duplicated on the left-hand side of the machine. Each rack bar drives a pinion 312, to which is connected, by means of a shaft 314, a gear 316 meshing with rack teeth 318 cut in the block 274, Figs. 7 and 8. When the bell-crank lever 308 is rotated in a clockwise direction, as viewed in Fig. 2, the block 274 will be moved inwardly through the train of mechanism just described. The slide 252 is connected to the block 274 in the following manner. The block 274 has a bore 320 in which an enlarged head 322 on a rod 324 is slidable. This rod extends through a plug 326, threaded into the outer end of the bore 320, and interposed between the inner face of the plug and the head 322 is a compression spring 328. The outer end of the rod 324 is threaded, and mounted on this threaded end is a curved arm 330 having a plunger-like end 332. This plunger-like end bears against a compression spring 334 seated in a bore 336 in the slide 252. The arm 330 is split and has a clamp screw 338, Fig. 8, which may be loosened to permit the threaded end of the rod 324 to be turned, by a screw driver or like tool, for the purpose of adjusting the tension of spring 328.

Figure 10:
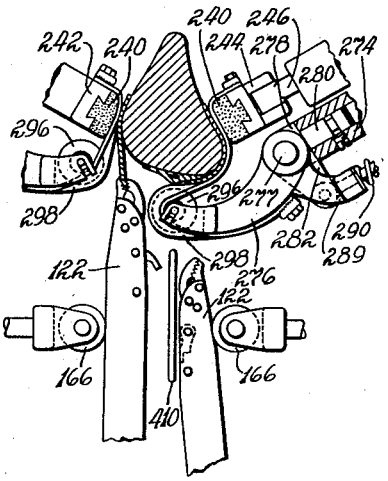
Fig. 10 is a plan view of certain of the operating elements of this machine in the positions assumed by these elements at an intermediate stage in their operation.

As the slides 274 are moved inwardly by the cams 306, the clamp members 240 and overlaying members 296 and 298 are brought first into a position corresponding to that shown at the left-hand side of Figs. 10 and 11. Further inward movement of the upper-clamping members being prevented by their engagement with the shoe, the continued movement of the slides 274, which occurs before dwells on the cams 306 are reached, compresses the springs 328 and 334, thus forcing the clamping members firmly against the top edge of the upper materials on each side of the shoe above the points of operation of the grippers. During the aforementioned dwell of the cams 306, the grippers are operated to pull the upper, as will be seen by reference to the timing chart in Fig. 17.

At the completion of this dwell, the block 274 on the left-hand side of the machine continues its inward movement, carrying with it the roll 296 and the web 298 first to a position corresponding to that shown at the right-hand side of Fig. 11 and finally to a position corresponding to that shown in Fig. 10. During this further inward movement of the block 274, which is permitted without building up undue pressure against the upper because of the effective length of the two springs 328 and 334, the gripper 122 on the left-hand side of the machine, at the right-hand side of Fig. 10, is swung inwardly by its associated roll 166 to wrap the upper about the last just in advance of the action of the overlaying members 296 and 298. As the gripper moves inwardly, and at just about the point in its inward movement where the upper comes into contact with the insole, see Fig. 11, the upper is released from the gripper by mechanism about to be described, whereupon the gripper is quickly moved down to the position shown at the right-hand side of Fig. 10, and out of the way of the overlaying members as they continue their inward movement to the position shown in Fig. 10. During this continued inward movement, the roll 296, acting through the web 298, follows the contour of the last, the arm 276 swinging downward against the resistance of spring 290 to permit this displacement of the roll. Accordingly, when the roll reaches the position shown in Fig. 10 it is urged upwardly toward the bottom of the shoe and, through the web, presses the upper firmly thereagainst. The gripper and overlaying members at the right-hand side of the machine are now operated in the above manner, and during their operation the gripper and overlaying members on the left-hand side of the machine are withdrawn. Now, as the main shaft of the machine completes its revolution, the slides 274 on both sides of the machine are returned to their original positions and the upper clamping members are moved away from the shoe, the parts on each side of the machine coming to rest in the positions shown in Fig. 2. As will be observed by reference to Figs. 10 and 11, the action of the upper-tensioning devices and overlaying members is a combined and progressive pulling, overdrawing or wrapping and pressing action, the upper being first tensioned and then overdrawn or wrapped around the shank portion of the last by the grippers, and the overlaying members following in immediately to press the upper against the last and also against the bottom surface of the insole. During the pulling and overdrawing action, the grippers are, by virtue of being mounted for rotation about their longitudinal axes and also to swing lengthwise of the shoe, adapted to assume such positions that the direction of their pull accommodates itself to the curvature of the last as the grippers are moved inwardly by the rolls 166. In this way, the upper is wrapped evenly and snugly about the curved shank portion of the last and is held in this position by the webs 298 after the grippers release and while the overlaying members complete their inward movements.

The rolls 166, which swing the grippers inwardly, are operated from the slides 274 by means of the following mechanism. Referring to Figs. 2 and 3, in which only the mechanism associated with the roll 166 on the right-hand side of the machine, at the left-hand side of these figures, is shown, each of these rolls is journaled on a pin 340 carried by a yoke 342 secured to the end of a rod 344. These rods pass through holes in the machine frame and are held against rotation therein by means of keys 346. Adjacent to the outer end of each of these rods is a threaded portion 348 on which is mounted a sleeve 350 and beyond this sleeve the end of each rod passes through a bore 352 in an exteriorly threaded thimble 354. The thimble is journaled on the extreme end of the rod and also on the sleeve 350, being held in position on the rod axially thereof by means of a cap screw 356 and a compression spring 358. A block 360 is threaded onto each of the thimbles 354 and these blocks each have an ear 362 provided with a notch 364. Two shafts 366 and 368, telescopically connected by means of a bore 370, slot 372, and key 374, see Fig. 3, are journaled in the machine frame and at their outer ends are rotatably connected respectively to the ears 362 on the blocks 360 by means of studs 361 which engage the notches 364. The outer ends of these shafts are threaded at 376, one with right-hand and the other with left-hand threads, and mounted on these threaded portions are trunnion blocks 378. Each trunnion block has a trunnion pin 380 extending therefrom and into an elongated hole 382 in the end of one arm 384 of a bell-crank lever. Each bell-crank lever is journaled on a stud 386 mounted in one of the frame extensions 28, see Fig. 8, and has a shorter arm 388 carrying a roller 390. The bottom side of each slide 274 is shaped to form a cam track 392 having a long dwell 394, a rise 396, and a shorter dwell 398, see Figs. 2, 7 and 8. During the first part of the inward movement of each of the slides 274, the roll 390 rides on the dwell 394, being held thereon by the action of the spring 168. After the upper-clamping members 240 have been brought in against the sides of the shoe and while the overlaying members are being operated, first on one side of the shoe and then on the other, in the manner explained above, the bell-crank levers 384 are swung inwardly as their rollers ride up the rises 396 and onto the dwells 398. The timing of the cams 306 is such that the lever 384 associated with the left-hand side of the machine moves first and during the resulting inward movement of the roll 166 the shaft 368 is shifted axially with respect to the shaft 366, this action being permitted by the telescopic connection above described. Later in the cycle of the machine and when the lever 384 which is associated with the right-hand side of the machine is operated, the shaft 366 will similarly move relatively to the shaft 368. As the slides 274 eventually return to their original positions, the upper gripping members will follow, since they are at all times held pressed against the rolls 166 by the action of the spring 168.

In order that the upper gripping devices may be properly positioned in a widthwise direction relative to shoes of different widths, means are provided for simultaneously shifting the rolls 166 toward or away from each other. The portion of the shaft 366 which is journaled in the frame has elongated flutes 400 thereon which are in mesh with a rack bar 402 slidably mounted in a guideway on the frame. This rack bar has an operating handle 404, Figs. 2 and 3, and movement of the bar by the handle effects rotation of the shaft 366 and also of the shaft 368. This rotation causes the threaded ends 376 of these shafts to move inwardly or outwardly with respect to the blocks 378. As a result of this movement of the shafts 366 and 368, the blocks 360 will likewise be moved and the rolls 166 shifted inwardly or outwardly of the machine. As the rolls are shifted, the gripper casings 124 are caused to follow the movement of the rolls against which they are held by the action of the spring 168. Thus, by manipulating the handle 404, the grippers may be separated or brought together in order to accommodate shoes of different widths. For individually adjusting the rolls 166 and the gripper casings 124, the thimbles 354 are provided with squared heads 406 for the application of a wrench or other similar turning tool. By rotating either of these thimbles, the rod 344 which is associated therewith, may be shifted inwardly or outwardly and the gripper casing which bears against its roll 166 accordingly positioned widthwise of the shoe. The springs 358 are of greater strength than the spring 168 to permit the foregoing adjustment of the grippers. The tension of the springs 358, which serve to prevent undue tension being placed on the upper when the grippers are moved inwardly, may be adjusted by turning the plugs 350 and these plugs are provided with holes 408 to receive a spanner wrench for making this adjustment.

The latches 138 of the grippers 122 are tripped, at appropriate times in the cycle of operation of the machine, by means of a plate 410 secured to a rod 412. This rod is slidably mounted in bores 414 in the machine frame and is held against rotation by means of a key 416, see Figs. 2, 3 and 6. On one end of this rod there is secured a roll 418 which is embraced by the opposite sides of a cam groove 420 formed in the upper end of an arm 422. This arm has a hub member journaled on a shaft 424 mounted in the machine frame, and extending from this hub is a second arm 426 carrying a roller 428 which runs in the groove of a cam 430, Fig. 1. Normally this roll rides along a dwell 432 of the cam groove, during which time the arm 422 is held fixed in the position shown in Fig. 1. The cam groove 430 has two oppositely directed throws 434 and 436, and as the roll 428 passes through these throws the arm 422 will be swung back or forth, first in one direction and then in the opposite direction, and the rod 412 moved first to the right and then to the left, Figs. 2 and 3. As has already been pointed out, the overlaying members on the left-hand side of the machine operate first, and during their operation the gripper 122, on that side of the machine, is swung inwardly by its associated roll 166. At the end of this inward movement of the gripper the throw 434 of the cam 430 reaches the roll 428 and the arm 422 is rocked to the right, Fig. 1. This movement of the arm 422 shifts the rod 412 in the direction of the arrow, Fig. 6, and causes the plate 410 to strike the latch 138 on this gripper, thus releasing its hold on the upper. A similar action occurs when, during the action of the overlaying members on the other side of the machine, the gripper on that side of the machine completes its inward movement. Now the throw 436 reaches the roll 428 and the arm 422 is swung to the left, thus shifting the rod 412 in the direction opposite to the arrow and causing the plate 410 to strike the latch on this gripper and release its hold on the upper.

The operating portions of the cam groove 420 are constructed to give a yielding action by means of plungers 440 having flat faces 442 which are normally in line with the sides of the cam groove, see Fig. 6. These plungers are slidably mounted in bores 444 formed in the upper end of the arm 422 and are held against turning in these bores by means of set screws 446 and keyways 448. Springs 450 hold the plungers in the position shown in Fig. 6, and with the set screws engaging ends of their associated keyways. This arrangement avoids any danger of overstraining or breaking of the parts should either gripper happen to be moved inwardly by its roll 166 to such a position that the throw of the cam 420 would cause the plate 410 to strike the gripper casing.

Figure 14:
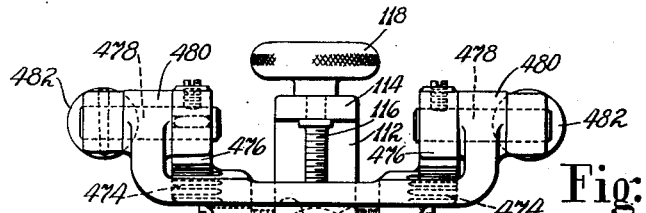
Fig. 14 is a view of parts of the machine looking in the direction of arrow XIV in Fig. 1.

The mechanism for lasting the forepart of the shoe, after the shank portion has been lasted, comprises flexible cable-like members in the form of coil springs 460, Figs. 1, 14 and 15, which at their inner ends are secured to the ball gage member 34. The outer ends of these springs are attached to downwardly and outwardly extending portions 462 of arms 464. These arms are mounted for swinging movement on the carrier 86 by means of shafts 466 and secured to these shafts are pinions 468. Slidably mounted on guide pins 469 at each side of the carrier is a rack bar 470 having teeth 472 meshing with one of the pinions 468. At their outer ends each of these rack bars have a second set of rack teeth 474 which mesh with gear quadrants 476. These quadrants are secured to shafts 478, journaled in extensions 480 of the carrier, and pinned to these shafts are operating handles 482. The arrangement is such that when either of these operating handles is swung in a clockwise direction, Fig. 1, the arm 464 and wiper spring 460, on that side of the machine will be swung in the direction of the arrow, Fig. 14.

During the shank-lasting operation the ball gage 34 is withdrawn from contact with the bottom of the shoe by means of mechanism about to be described, so that the forepart-lasting wipers, i. e., the springs 460, will be out of the way of the overlaying members as the latter move in, over the shank portion of the shoe. When the ball gage returns it will rest on these previously overlasted upper materials and the springs 460 will now extend outwardly over those portions of the lasted upper which are located just back of the forepart. Now as the handles 482 are operated these springs will wipe the upper in the forepart over onto the insole and come to rest in the positions indicated in dotted lines in Fig. 15. The diameter of these springs is slightly greater than the distance between a lower face 484 of the carrier 86 and the bottom of the forepart of the shoe, so that these springs will be slightly compressed and caused to exert a pressure on the overlasted upper to hold it firmly against the insole, see dotted line position of springs 460, Fig. 15. After both of these wipers has been operated the shoe is removed from the machine and the handles 482 are returned to their original positions in which they will be held by the action of the springs 460 until the next operation. Referring to Fig. 1, it will be observed that the wiper springs are secured to the rearmost portion of the ball-gage member 34. This brings the inner ends of these elements somewhat below the level of the flat forepart of the shoe bottom. Hence, when the wipers are operated they will roll up over the curved portion of the shoe which is just back of the forepart and then swing inwardly over the shoe bottom, carrying with them the upper and laying it smoothly over the insole in the forepart in the manner shown in Fig. 13.

The ball gage 34 is withdrawn during the operation of the overlaying members and subsequently returned to the position where it contacts the bottom of the shoe, by means of a cam 490, a bell-crank lever 492, a link 494, and a second bell-crank lever 496, see Figs. 1 and 3. The cams 219, 306, 430 and 490 are all associated with a main drive shaft 498 which is journaled in bearings 500 in the machine frame 24. Any suitable type of power mechanism may be provided for rotating the main shaft through a single revolution at each depression of an operating treadle, not shown. The cams 219, 430 and one of the cams 306 are all cut in a single block 502, while the cam 490 and the other cam 306 are likewise cut in another and similar block 504. The timing of these cams is illustrated in the chart of Fig. 17, to which reference will be made from the following description of a complete cycle of operation of the machine.

When a shoe is placed in the machine it assumes the position shown in Figs. 1 and 2 and the upper at each side of its shank portion, just back of the ball, extends into the open jaws of the grippers, the various operating instrumentalities of the machine being in the positions shown in these figures. If necessary, to accommodate the particular shoe to be lasted, the grippers may be adjusted in a widthwise direction with respect to the shoe, singly by means of the thimbles 354 or simultaneously by operating the handle 404. Adjustment of the grippers in a heightwise direction with respect to the shoe may also be required to assure a suitable gripping of the upper by the grippers and such adjustment may be made by turning the hand wheel 218.

The treadle, not shown, is now depressed to start the power rotation of the main shaft 498. Referring to the timing chart in Fig. 17, during the first 30° of rotation of the main shaft the grippers are closed on the upper at the sides of the shoe by the action of the cam 219 and then, as the shaft turns through the next 30°, the shoe clamps at each side of the machine are brought in and pressed firmly against the upper by the simultaneous action of the two cams 306. Now the cam 219 again operates the arm 214 and thus causes the grippers to exert a strong pull on the upper, this pull reaching its maximum when the shaft has turned through 90°, at which point the cam 490 has effected the withdrawal of the ball gage away from the shoe bottom. Next the cam 306 which is associated with the left-hand side of the machine causes the slide 274 to move inwardly still further. This movement of the slide 274 moves the roll 296 and web 298 in against the shoe, first to the position shown in Fig. 11, and finally to the position shown in Fig. 10, the latter position of these parts being reached when the main shaft has completed one-third of a turn. During this inward movement of the roll and web, the gripper 122 on this side of the machine is also being moved inwardly and kept just ahead of the roll and web by the action of the cam surface 396 on the slide 274. In this way the tensioned upper is first wrapped around the last by the inward movement of the gripper and is progressively pressed firmly against the last by the action of the following roll and web. As the gripper is swung inwardly it may turn about its longitudinal axis, or even swing lengthwise of the shoe, to adjust itself to the resistance to the upper as it is wrapped around the curved portion of the last.

At about the point in the inward movement of this gripper where the upper has been brought into contact with the insole, see Fig. 11, the throw 434 of the cam 430 shifts the rod 412 to the right, Fig. 3, thus causing the plate 410 to strike the latch 138, whereupon the gripper is released and pulled quickly down into the position shown in Fig. 10, and out of the way of the roll and web as they move in to press the upper against the last and also against the bottom of the insole. The several cams now operate through dwells to hold the parts in the positions shown in Fig. 10 until a half turn of the main shaft has been completed. It will be understood, of course, that the marginal portions of the insole have been suitably treated with pressure-responsive adhesive so that the upper, as it is pressed against these portions by the roll and web, is securely attached thereto.

As the second half turn of the main shaft begins, the cam 306 which is associated with the left-hand side of the machine operates to withdraw the slide 274 sufficiently to return the roll and web on that side of the machine to positions corresponding to those occupied by the roll and web on the right-hand side of the machine in Fig. 10. At the same time, the cam 306 which is associated with the right-hand side of the machine operates to swing the gripper 122 on that side of the machine inwardly and also to move the roll and web inwardly of the shoe to press the upper against the shoe bottom in exactly the same manner as these operations were performed by the parts on the other side of the machine. During this action of the cam 306 the throw 436 of cam 430 releases the gripper, which is then moved quickly away from the shoe, to provide operating space for the roll and web as they are moved in to press the upper against the bottom of the shoe. The roll and web on the right-hand side of the machine are held in this position until the main shaft has completed three-fourths of its revolution, whereupon they are returned to the positions in which they are shown in Fig. 10. At the same time the grippers on each side of the shoe are restored to their original positions, as shown in Fig. 2, by the action of the cam 219, and the ball gage is brought back into contact with the shoe bottom by means of the cam 490. Finally, as the shaft completes its last 60° of rotation, the shoe clamps on each side of the shoe are released and these parts returned to the positions shown in Fig. 2, which they reach just as the main shaft comes to a stop.

Before releasing the shoe for removal from the machine, the operator, while still holding the shoe with one hand as he had been doing throughout the power operation of the machine, reaches up and pulls the handles 482 toward him, first one and then the other, thus operating the forepart-lasting wipers 460 so as to continue the side lasting of the shoe from the shank portion up to the forepart and forwardly about to the tip line on each side of the shoe.

Having described the invention, what I claim as new and desire to secure by Letters Patent of the United States is:

1. A machine for lasting the shank portions of shoes comprising, in combination, means for tensioning the upper at opposite sides of the shank portion of a shoe, and means including a heel support and a toe support for engaging the bottoms of the heel and toe ends of shoes to support them against the pull of said tensioning means with the bottoms of their shank portions substantially normal to the line of action thereof, said heel support being fixed against movement heightwise of a shoe and said toe support being adjustable with respect to said heel support to accommodate shoes of different heel heights.

2. A machine for lasting the shank portions of shoes comprising, in combination, means for seizing the upper at opposite sides of a shoe in the shank portion and for exerting a heightwise pull thereon, and means including a heel support and a toe support for holding the shoe against the pull of said pulling means, said toe support being movable heightwise of the shoe for accommodating shoes of different heel heights while maintaining the bottoms of their shank portions substantially normal to the line of action of the upper-pulling means.

3. A machine for lasting the shank portions of shoes comprising, in combination, means for seizing and tensioning the upper at the opposite sides of the shank portion of a shoe, a heel support and a toe plate for supporting a shoe in the machine against the pull of said tensioning means, said heel support being fixed against movement heightwise of a shoe in the machine and said toe plate being swingable heightwise of the shoe about an axis of rotation transverse thereto for accommodating shoes of different heel heights, the location of said axis being such that the bottoms of the shank portions of all shoes, when supported on the heel support and toe plate, will be substantially normal to the line of action of said tensioning means.

4. A machine for lasting the shank portions of shoes comprising, in combination, means for seizing and tensioning the upper at the opposite sides of the shank portion of a shoe, a heel abutment for engaging and supporting the heel end of a shoe in the machine, and a toe plate for engaging and supporting the toe end of the shoe, said toe plate being movable heightwise and widthwise of the shoe, about two intersecting axes passing through the ball center of the shoe, to so position the toe plate with respect to the heel abutment that right and left shoes of different heel heights will be supported in the machine with the bottoms of their shank portions substantially normal to the line of action of said tensioning means.

5. A machine for lasting the shank portions of shoes comprising, in combination, means for seizing and tensioning the upper at opposite sides of the shank portion of a shoe, a heel abutment and a toe support for engaging the bottom of a shoe at its heel and toe ends to support the shoe against the pull of said upper-tensioning means, a ball gage having an arcuate face for engaging that portion of the shoe bottom that curves upwardly into the shank rearwardly of the ball line to locate the shoe lengthwise with respect to said tensioning means, said toe support being adjustable heightwise of the shoe about an axis which is the center of curvature of said arcuate face for accommodating shoes of different heel heights.

6. A machine for lasting the shank portions of shoes comprising, in combination, means for seizing and tensioning the upper at opposite sides of the shank portion of a shoe, a heel abutment and a toe plate for engaging the bottom of a shoe at its heel and toe ends to support the shoe against the pull of said upper-tensioning means, and a ball gage for engaging that portion of the shoe bottom that curves upwardly into the shank rearwardly of the ball line to locate the shoe lengthwise with respect to said tensioning means, said toe plate being adjustable lengthwise of the shoe to accommodate shoes of different sizes.

7. A machine for lasting the shank portions of shoes comprising, in combination, means for seizing and tensioning the upper at opposite sides of the shank portion of a shoe, a heel abutment and a toe plate for engaging the shoe on its bottom to support it against the pull of the upper-tensioning means, said toe plate having projections adapted to be received in cooperating recesses provided in the toe end of the shoe bottom, a ball gage for engaging that portion of the shoe bottom that curves upwardly into the shank rearwardly of the ball line to locate the shoe lengthwise with respect to the upper-tensioning means, said toe plate being movable heightwise and widthwise of the shoe for accommodating right and left shoes of different heel heights and also being adjustable lengthwise to bring said projections into registry with recesses in the toe ends of shoes of different sizes.

8. A machine for lasting the shank portions of shoes comprising, in combination, means for seizing and tensioning the upper at the opposite sides of the shank portion of a shoe, means for supporting the heel end of the shoe, means associated with said supporting means for locating the heel end of the shoe widthwise in the machine, a toe support having projections for engaging cooperating recesses provided in the toe end of the shoe, and means for selectively positioning said toe support on one side or the other of a plane passing through said heel-end locating means and equidistant from the tensioning means for operating on each side of the shoe so that both right and left shoes may be supported in said machine with their shank portions substantially centered with respect to said upper-tensioning means.

9. A machine for lasting the shank portions of shoes comprising, in combination, means for tensioning the upper at opposite sides of the shank portion of a shoe, means for laying the tensioned upper in over the bottom of the shoe and for securing the overlaid upper to the shoe bottom, a gage arranged to be positioned adjacent to the bottom of the shoe for locating the shoe lengthwise in the machine with respect to said tensioning and overlaying means, and means for moving the gage away from the bottom of the shoe prior to the operation of the overlaying means.

10. A machine for lasting the shank portions of shoes comprising, in combination, means for tensioning the upper at the opposite sides of the shank portion of a shoe, means for laying the tensioned upper in over the bottom of the shoe and for pressing the overlaid upper against the bottom of the shoe, a gage for contacting the shoe bottom where the forepart starts to curve upwardly into the shank to locate the shoe lengthwise in the machine with respect to said upper-tensioning and overlaying means, and means for moving said gage away from the shoe bottom during the operation of the upper-tensioning means and prior to the operation of said overlaying means.

11. A machine for lasting the shank portions of shoes comprising, in combination, power-operated means for tensioning the upper at the opposite sides of the shank portion of a shoe, power-operated means for laying the tensioned upper in over the bottom of the shoe and for pressing it against the bottom of the shoe, a gage for contacting the shoe bottom where the forepart starts to curve upwardly into the shank to locate the shoe lengthwise in the machine with respect to said upper-tensioning and overlaying means, and means operated by power and in timed relation to the action of the upper-tensioning and overlaying means for moving said gage away from the shoe bottom during the operation of the upper-tensioning means and prior to the operation of said overlaying means.

12. A machine for lasting the shank portions of shoes comprising, in combination, means for tensioning the upper at the opposite sides of the shank portion of a shoe, means for laying the tensioned upper in over the bottom of the shoe and for pressing it against the shoe bottom, a toe plate and a heel abutment for supporting the shoe against the pull of said upper-tensioning means, a gage arranged to be positioned adjacent to the bottom of a shoe supported on said toe plate and heel abutment for locating the shoe lengthwise in the machine with respect to the upper-tensioning means, and means for moving the gage away from the shoe bottom prior to the operation of the overlaying means.

13. A machine for lasting shoes comprising, in combination, lasting means for laying the upper in over the bottom of a shoe, means for supporting the shoe during the operation of said lasting devices, and means for contacting the bottom of the shoe to locate it lengthwise in the machine with respect to the lasting devices, said last-named means being movable away from the shoe bottom after the shoe has been located thereby and before the operation of said lasting devices.

14. A machine for lasting shoes comprising, in combination, power-operated lasting devices for laying the upper in over the bottom of a shoe, means for supporting the shoe during the operation of the lasting devices, a gage for contacting the bottom of the shoe to locate it lengthwise in the machine with respect to the lasting devices, and means for moving the gage away from the bottom of the shoe prior to the operation of said lasting devices.

15. A machine for lasting shoes comprising, in combination, power-operated lasting means for laying the upper in over the bottom of a shoe, means for supporting the shoe during the operation of the lasting devices, a gage for contacting the bottom of the shoe to locate it lengthwise in the machine with respect to the lasting devices, and automatically operable means for moving the gage away from the bottom of the shoe prior to the operation of said lasting devices.

16. In a machine for lasting shoes having means for supporting a shoe and a gripper for seizing and pulling the upper of a shoe on said supporting means, the combination of means for operating said gripper including a member associated with the gripper and movable toward and away from said supporting means, a stop means for engaging a portion of the gripper to limit movement thereof in a direction toward said supporting means, and means for simultaneously shifting said member and the stop means to adjust the gripper with respect to said supporting means.

17. In a machine for lasting shoes having means for supporting a shoe and grippers for seizing and pulling the upper of a shoe on said supporting means, the combination of means for operating said grippers including a member associated with the grippers and movable toward and away from said supporting means, a stop means for engaging portions of the grippers to limit movement thereof in a direction toward said supporting means, and means for simultaneously shifting said member and the stop means to adjust the grippers with respect to said supporting means.

18. In a lasting machine having means for supporting a shoe and grippers for seizing and pulling the upper of a shoe on said supporting means, the combination of a slide movable toward and away from said supporting means, means carried by the slide for operating the grippers, stop means for limiting movement of the grippers toward the supporting means, and means for simultaneously shifting said operating means relatively to the slide and said stop means relatively to said supporting means for adjusting the grippers with respect to the supporting means.

19. In a lasting machine having means for supporting a shoe and grippers for seizing and pulling the upper of a shoe on said supporting means, the combination of a slide movable toward and away from said supporting means, gripper-operating means carried by the slide, stop means for engaging the grippers to limit movement thereof toward the supporting means, and threaded means for simultaneously shifting said gripper-operating means relatively to said slide and said stop means relatively to said supporting means for adjusting the grippers.

20. In a lasting machine having means for supporting a shoe and grippers for seizing and pulling the upper of a shoe on said supporting means, the combination of a slide movable toward and away from said supporting means, gripper-operating means carried by the slide, stop means for engaging the grippers to limit movement thereof toward the supporting means, and threaded means for simultaneously shifting said gripper-operating means and said stop means for adjusting the grippers with respect to said supporting means, said threaded means being constructed and arranged to hold said stop means fixed with respect to said supporting means while permitting movement of the gripper-operating means with said slide.

21. In a lasting machine having a frame and means on the frame for supporting a shoe, the combination of gripper means for seizing and pulling the upper of a shoe on the supporting means, means for operating said gripper means including a slide movable toward and away from the supporting means, a block movably mounted on the slide, a screw threaded through the block and rotatably mounted on the slide for shifting the block relatively to the slide, stop means for limiting movement of the gripper means toward the supporting means, a second screw rotatably mounted on the frame and threaded through the stop means for adjusting the stop means relatively to the frame and to the supporting means, and a sliding connection between said screws.

22. In a lasting machine having a shoe support and grippers for seizing and pulling the upper of a shoe on the support, said grippers being mounted for movements widthwise of the shoe to lay the tensioned upper in over the shoe bottom and being also swingable lengthwise of the shoe and rotatable each about an axis normal to the shoe bottom for accommodating the pull to various curvatures of the last encountered by the upper as the grippers are moved widthwise of the shoe, means for operating the grippers, stop means normally positioned for engaging the grippers to limit their movement toward the shoe support, and means associated with the gripper-operating means for moving said stop means away from said operative position during the action of said grippers to pull the upper and for thereafter returning them to operative position.

23. In a lasting machine, the combination with means for supporting a shoe to be lasted and a power-operated gripper for seizing and pulling the upper to stretch it over the last, of means operating in timed relation to said gripper for clamping the upper firmly against the last prior to the operation of said gripper.

24. In a lasting machine having means for supporting a shoe to be lasted and a power-operated gripper for pulling the upper heightwise of the last, the combination with said gripper of means for clamping the upper against the last comprising a resilient member movable into engagement with the upper, above the point of operation of said gripper, to press the upper against the last, and means for operating said upper-clamping means in timed relation to said gripper to clamp the upper firmly against the last prior to the operation of the gripper.

25. In a lasting machine having means for supporting a shoe to be lasted and a pair of grippers for seizing opposite marginal portions of the upper of the shoe and for tensioning the upper heightwise of the last, the combination with said grippers of upper-clamping members mounted for movement into engagement with the top edge of the upper, above the points of operation of said grippers, to press the upper against the last, and means for operating said upper-clamping members in timed relation to said grippers to clamp the upper firmly to the last prior to the operation of said grippers.

26. In a lasting machine having means for supporting a shoe to be lasted and a plurality of power-operated grippers for seizing opposite marginal portions of the upper of the shoe and for tensioning the upper heightwise of the last, the combination with said grippers of upper-clamping members mounted for movement into engagement with the upper, above the points of operation of said grippers, to press the upper firmly against the last, and means for operating said upper-clamping members in timed relation to said grippers to clamp the upper firmly to the last prior to the operation of said grippers.

27. In a lasting machine having means for supporting a shoe to be lasted and lasting means for tensioning opposite side portions of the upper and for laying the tensioned portions of the upper in over the bottom of the shoe, the combination with said lasting means of upper-clamping means comprising resilient members movable into engagement with the top edge of the upper, above the points of operation of said lasting means, to press the upper against the last, and means for operating said clamping means prior to the operation of said lasting means.

28. In a lasting machine having means to support a shoe to be lasted and power-operated lasting means for tensioning opposite side portions of the upper and for laying the tensioned upper portions in over the bottom of the shoe and pressing them against the shoe bottom, the combination with said lasting means of upper-clamping means comprising resilient members movable into engagement with the top edge of the upper, above the points of operation of said lasting means, to press the upper against the last, and means for operating said upper-clamping means in timed relation to said lasting means to clamp the upper firmly to the last prior to the operation of the lasting means.

29. In a lasting machine having means for supporting a shoe to be lasted and means for tensioning the upper of a shoe on said support, the combination of means for laying the tensioned upper in over the bottom of the shoe comprising a flexible web, means operative prior to the action of the upper-tensioning means for pressing one end of the web against the upper, and means for thereafter moving the web inwardly over the bottom of the shoe to lay it over the tensioned upper so that the web wraps the upper about the last and presses it firmly against the bottom of the shoe.

30. In a lasting machine having means for supporting a shoe to be lasted and means for tensioning portions of the upper at opposite sides of the waist of a shoe on said supporting means, the combination of means for laying the tensioned upper in over the bottom of the shoe, first on one side and then on the other, comprising a pair of flexible elastic webs arranged on opposite sides of the supporting means, means operative prior to the action of the upper-tensioning means for pressing one end of each web against the top edge of the upper on its side of the shoe, and means for thereafter moving the webs inwardly over the bottom of the shoe so as to cause the body of each web to wrap the upper around the last on its side of the shoe and to press it firmly against the bottom of the shoe.

31. In a lasting machine having means for supporting a shoe to be lasted and means for tensioning the upper of a shoe on said supporting means, the combination of means for laying the tensioned upper in over the bottom of the shoe comprising a flexible web, an upper-clamping member to which one end of the web is secured and over which it extends, a carrier for the opposite end of the web and to which that end is secured, means for simultaneously moving said clamping member and said carrier toward a shoe to cause the clamping member to press the upper against the last prior to the operation of the upper-tensioning means, and means for thereafter continuing the inward movement of the carrier to cause the body of the web to wrap the upper around the last and to press its lasting margin firmly against the bottom of the shoe.

32. In a lasting machine having means for supporting a shoe to be lasted and means for tensioning the upper at the opposite sides of the waist portion of a shoe on the supporting means, the combination of means for laying the tensioned upper in over the bottom of the shoe comprising a pair of flexible webs, an upper-clamping member on each side of said supporting means to which one end of a web is secured and over which that web extends, a carrier associated with each clamping member and to which the opposite end of a web is secured, means for simultaneously moving said clamping members and said carriers toward the shoe to cause the clamping members to press the top edge of the upper against the last on each side of the shoe prior to the operation of said upper-tensioning means, and means for thereafter continuing the inward movements of the carriers to cause the body of each web to wrap the upper on its side of the shoe around the last and to press its lasting margin firmly against the bottom of the shoe.

33. In a lasting machine having means for supporting a shoe to be lasted and means for tensioning the upper of a shoe on said supporting means, the combination of means for laying the tensioned upper in over the bottom of the shoe comprising a flexible web, a resilient upper-clamping member to which one end of the web is secured and over which it extends, a carrier for the opposite end of the web provided with a roll engaging the body portion of the web, means for simultaneously moving said clamping member and the carrier toward the shoe to cause the clamping member to press the upper against the last prior to the action of the upper-tensioning means, and means for thereafter continuing the movement of the carrier to bring the roll in over the shoe bottom so that the body of the web wraps the upper around the last and presses its lasting margin firmly against the bottom of the shoe.

34. In a lasting machine having means for supporting a shoe to be lasted and means for tensioning the upper at the opposite sides of the waist portion of a shoe on said supporting means, the combination of means for laying the tensioned upper in over the bottom of the shoe comprising a pair of flexible webs, a resilient upper-clamping member on each side of the supporting means to which one end of a web is secured and over which that web extends, a carrier for the opposite end of a web associated with each of said clamping members and including a roll engaging the body portion of that web, means for simultaneously moving said clamping members and the carriers toward the shoe to cause the clamping members to press the top edge of the upper at each side of the shoe against the last prior to the action of the upper-tensioning means, and means for thereafter continuing the movement of the carriers to bring the rolls in over the shoe bottom, first on one side and then on the other, so that the body portions of the webs wrap the upper around the last and press its lasting margins against the shoe bottom.

35. In a lasting machine having means for supporting a shoe to be lasted and means for tensioning the upper of a shoe on said supporting means, the combination of means for laying the tensioned upper in over the bottom of the shoe comprising a flexible web, a resilient upper-clamping member to which one end of the web is secured and over which that web extends, a carrier for supporting the opposite end of the web and provided with a yieldably mounted roll over which the body of the web passes, means for simultaneously moving said clamping member and the carrier toward the shoe to cause the clamping member to press the top edge of the upper against the last prior to the action of the upper-tensioning means, and means for thereafter continuing the movement of the carrier to bring the roll in over the shoe bottom so that the body of the web wraps the upper around the last and the yieldable roll, acting through the web, presses the lasting margin of the upper firmly against the bottom of the shoe.

36. In a lasting machine having means for supporting a shoe to be lasted and means for tensioning the upper at the opposite sides of the waist portion of a shoe on the supporting means, the combination of means for laying the tensioned upper in over the bottom of the shoe comprising a pair of flexible webs, a resilient upper-clamping member on each side of said supporting means to which one end of a web is secured and over which that web extends, a carrier for the opposite ends of a web associated with each of said clamping members and provided with a yieldably mounted roll over which the body of that web passes, means for simultaneously moving said clamping members and their associated carriers toward the shoe to cause the clamping members to press the top edges of the upper against the last on opposite sides of the shoe prior to the action of said upper-tensioning means, and means for thereafter continuing the inward movement of the carriers to bring their rolls in over the shoe bottom, first on one side and then on the other, so that the body portions of the webs wrap the upper around the last and the yieldably mounted rolls, acting through the webs, press the lasting margins of the upper against the bottom of the shoe.

37. In a lasting machine having a support for a shoe to be lasted, the combination of a gripper for seizing the marginal portion of the upper of a shoe on the support, said gripper being movable away from the bottom of the shoe to tension the upper heightwise of the last, means for moving the gripper inwardly over the shoe bottom, while maintaining the upper under tension, thereby tightly to wrap the upper about the last, a flexible web, means for pressing one end of the web against the upper prior to the action of said gripper to tension and to wrap the upper about the last, and means for causing the body of the web progressively to engage the upper as it is wrapped about the last and to press it firmly against the side of the last and the bottom of the shoe.

38. In a lasting machine having a support for a shoe to be lasted, the combination of grippers for seizing marginal portions of the upper at the opposite sides of a shoe on the support, said grippers being movable away from the bottom of the shoe to tension the upper heightwise of the last, means for moving the grippers inwardly over the shoe bottom while maintaining the upper under tension, thereby tightly to wrap the upper about the last first on one side of the shoe and then on the other, a pair of flexible webs arranged one on each side of the support, means for simultaneously pressing one end of each web against the top edge of the upper on its side of the last prior to the action of the grippers to tension and wrap the upper about the last, and means for causing the body of each web progressively to engage the upper on its side of the last as the upper is being wrapped around the last by the gripper on that side and to press it firmly against the side of the last and the bottom of the shoe.

39. In a lasting machine having a support for a shoe to be lasted, the combination of a gripper for seizing the upper, said gripper being movable away from the bottom of the shoe to tension the upper heightwise of the last, means for moving the gripper inwardly over the shoe bottom while maintaining the upper under tension, thereby tightly to wrap the upper around the last, a flexible web, means for pressing one end of the web against the top edge of the upper, prior to the action of the gripper to tension and to wrap the upper around the last, means for bringing the body of the web progressively into engagement with the upper as the upper is wrapped around the last, means for releasing the upper from the gripper when the upper has been brought in over the shoe bottom, and means for applying pressure on the upper through the web for pressing the upper against the shoe bottom.

40. In a lasting machine having a support for a shoe to be lasted, the combination of a pair of grippers for seizing marginal portions of the upper at opposite sides of a shoe on the support, said grippers being movable away from the shoe bottom to tension the upper heightwise of the last, means for moving the grippers inwardly over the shoe bottom while maintaining the upper under tension, thereby tightly to wrap the upper around the last first on one side of the shoe and then on the other, a pair of flexible webs arranged one on each side of the support, means for simultaneously pressing one end of each web against the top edge of the upper on its side of the shoe prior to the action of the grippers to tension and to wrap the upper about the last, means for bringing the body of each web progressively into engagement with the upper on its side of the shoe as the upper is wrapped around the last by the gripper on that side of the shoe, means for releasing the upper from the gripper when the upper has been brought in over the shoe bottom, and means for applying pressure through the web for pressing the upper against the shoe bottom.

41. In a lasting machine, the combination with a shoe support and means for lasting the opposite sides of the shank portion of a shoe on said support rearwardly of its ball line, of means separate from said shank lasting means for continuing the lasting operation forwardly into the forepart comprising flexible overlaying devices arranged to act on the shoe at opposite sides thereof respectively and each arranged progressively to engage the upper from a point in back of the ball line forwardly into the forepart, and means for operating said overlaying devices.

42. In a lasting machine, the combination with a shoe support and means for lasting the shank portion of a shoe rearwardly of its ball line, of means for continuing the lasting operation forwardly into the forepart comprising a flexible cable-like member, means for holding one end of the member in against the lasted shank portion of the shoe rearwardly of the ball line, and means for swinging the opposite end of said member forwardly and inwardly over the shoe bottom thereby causing the cable-like member progressively to engage the unlasted portion of the upper from a point in back of the ball line forwardly into the forepart and to lay it in over the bottom of the shoe.

43. In a lasting machine, the combination with a shoe support and means for lasting the shank portion of a shoe rearwardly of its ball line, of means for continuing the lasting operation forwardly into the forepart comprising flexible cable-like members, means for holding one end of each of said members in against the lasted shank portion of the shoe rearwardly of the ball line, and means for swinging the opposite ends of the cable-like members forwardly and inwardly over the shoe bottom thereby causing said members progressively to engage the unlasted portions of the upper on opposite sides of the shoe from points in back of the ball line forwardly into the forepart and to lay said portions of the upper in over the bottom of the shoe.

44. In a lasting machine, the combination with a shoe support and means for lasting the shank portion of a shoe rearwardly of the ball line, said support having a bottom face generally parallel to and spaced from the forepart of the bottom of a shoe supported thereon, of means for continuing the lasting operation forwardly into the forepart comprising an elongated flexible member, said flexible member being substantially circular in cross section and diametrically compressible, means for holding one end of the member in against the lasted shank portion of the shoe rearwardly of the ball line, and means for swinging the opposite end of said member forwardly and inwardly over the shoe bottom thereby causing said flexible member progressively to engage the unlasted portion of the upper from a point in back of the ball line forwardly into the forepart and to lay said portion of the upper in over the bottom of the shoe, said flexible member being of such a size as to be compressed between the bottom face of the support and the overlaid portion of the upper as said member is swung inwardly over the latter so that the overlaid upper is pressed firmly against the bottom of the shoe.

45. In a lasting machine, the combination with a shoe support provided with a bottom face which is generally parallel to and spaced from the forepart of the bottom of a shoe supported thereon, and means for lasting the shank portion of a shoe on opposite sides thereof rearwardly of the ball line, of means for continuing the lasting operation forwardly into the forepart comprising a pair of elongated flexible members, said members being substantially circular in cross section and diametrically compressible, means for holding one end of each member in against the lasted shank portion of the shoe rearwardly of the ball line, and means for swinging the opposite ends of said flexible members forwardly and inwardly over the shoe bottom thereby causing said members progressively to engage the unlasted portions of the upper on opposite sides of the shoe from a point in back of the ball line forwardly into the forepart and to lay said portions of the upper in over the shoe bottom, said flexible members being of such size as to be compressed between the bottom face of the support and the overlaid upper portions as said members are swung inwardly over the shoe bottom so that the overlaid upper portions are pressed firmly against the bottom of the shoe.

46. In a lasting machine, a support for a shoe to be lasted, flexible overlaying devices comprising cable-like members, means for holding one end of each cable-like member in against the bottom of the shoe at a point located back of the ball line, and means for swinging the opposite ends of the members forwardly and inwardly over the shoe bottom thereby causing said members progressively to engage the upper from a point back of the ball line forwardly into the forepart and to lay it in over the bottom of the shoe.

47. In a lasting machine, a support for a shoe to be lasted having a bottom face which is generally parallel to and spaced from the forepart of the bottom of a shoe supported thereon, a pair of elongated flexible members, said members being substantially circular in cross section and diametrically compressible, means for holding one end of each member in against the bottom of the shoe in its shank portion, and means for swinging the opposite ends of said flexible members forwardly and inwardly over the shoe bottom and thereby causing said members progressively to engage the upper from a point back of the ball line forwardly into the forepart and to lay it in over the shoe bottom, said flexible members being of such size as to be compressed between the bottom face of the shoe support and the overlaid upper as said flexible members are swung inwardly over the shoe bottom so that the overlaid upper is pressed firmly against the bottom of the shoe.

48. In a lasting machine, a shoe support, a ball gage movable into contact with the shoe bottom for locating the shoe lengthwise in the machine, means for lasting in the upper at opposite sides of the shoe in its shank portion including overlaying devices arranged to move inwardly over the shank portion of the shoe, first on one side and then on the other, a pair of movable members associated with said support, a pair of flexible cable-like members each secured at one of its ends to said ball gage and at its opposite end attached to one of said movable members, means for operating said overlaying devices to last the shank portion of the shoe, mechanism for holding said ball gage away from the shoe bottom during the operation of said overlaying devices and for thereafter returning said ball gage into contact with the shoe bottom, and means for operating said movable members to swing said cable-like members forwardly and inwardly over the shoe bottom to continue the lasting operation forwardly from the shank portion into the forepart on each side of the shoe.

49. In a lasting machine, a shoe support, a member movable from a remote position into contact with the bottom of the shoe in the vicinity of its ball line, said member having a concave surface adapted to conform to that portion of the shoe bottom which curves upwardly from the forepart toward the shank, a pair of arms mounted for swinging movement on said support, a pair of cable-like members each having an inner end secured to said movable member and an outer end attached to one of said swingable arms, means for moving said movable member into contact with the shoe bottom to bring the inner ends of said cable-like members against the bottom of the shoe at points back of the ball line, and means for operating said swingable arms to swing said cable-like members forwardly and inwardly over the shoe bottom thereby causing said members progressively to engage the upper on each side of the shoe from a point in back of the ball line forwardly into the forepart and to lay said upper in over the bottom of the shoe.

JOHN T. LANCASTER.